(12) United States Patent
Arasaki

(10) Patent No.: US 11,168,736 B2
(45) Date of Patent: Nov. 9, 2021

(54) THRUST WASHER

(71) Applicant: TAIHO KOGYO CO., LTD., Toyota (JP)

(72) Inventor: Shinya Arasaki, Toyota (JP)

(73) Assignee: TAIHO KOGYO CO., LTD.

( * ) Notice: Subject to any disclaimer, the term of this patent is extended or adjusted under 35 U.S.C. 154(b) by 0 days.

(21) Appl. No.: 16/639,067

(22) PCT Filed: Aug. 30, 2018

(86) PCT No.: PCT/JP2018/032123
§ 371 (c)(1),
(2) Date: Feb. 13, 2020

(87) PCT Pub. No.: WO2019/106901
PCT Pub. Date: Jun. 6, 2019

(65) Prior Publication Data
US 2020/0200218 A1 Jun. 25, 2020

(30) Foreign Application Priority Data

Nov. 30, 2017 (JP) .............................. JP2017-230202

(51) Int. Cl.
*F16C 33/10* (2006.01)
*F16C 17/04* (2006.01)
*F16C 9/02* (2006.01)

(52) U.S. Cl.
CPC .............. *F16C 33/106* (2013.01); *F16C 9/02* (2013.01); *F16C 17/047* (2013.01)

(58) Field of Classification Search
CPC .......... F16C 9/02; F16C 17/04; F16C 17/047; F16C 17/065; F16C 33/106; F16C 33/1065; F16C 33/1075; F16C 27/02
See application file for complete search history.

(56) References Cited

U.S. PATENT DOCUMENTS

| 3,413,048 A | 11/1968 | Eudier |
| 3,786,289 A * | 1/1974 | Baclawski .............. F16C 17/18 310/90 |
| 6,149,310 A | 11/2000 | Ono et al. |

(Continued)

FOREIGN PATENT DOCUMENTS

| JP | 132963 C2 | 12/1939 |
| JP | H07-119737 A | 5/1995 |

(Continued)

OTHER PUBLICATIONS

Notice of Reasons for Refusal for Application No. 2017-230202, dated Dec. 10, 2019 (5 pages).

(Continued)

*Primary Examiner* — Alan B Waits
(74) *Attorney, Agent, or Firm* — Harness, Dickey & Pierce, P.L.C.

(57) ABSTRACT

A thrust washer according to an embodiment has an annular washer body having a first thrust surface and a second thrust surface that receive a thrust load, and a tapered portion formed on at least one of the first thrust surface and the second thrust surface, and the washer body has a waviness larger than a difference in height of the tapered portion in a direction perpendicular to the thrust surface.

4 Claims, 5 Drawing Sheets

(56) References Cited

U.S. PATENT DOCUMENTS

| | | | |
|---|---|---|---|
| 6,929,402 B1 | 8/2005 | Titus | |
| 2002/0034349 A1* | 3/2002 | Thompson | F16C 9/02 384/420 |
| 2002/0094143 A1* | 7/2002 | Yang | F16C 9/02 384/294 |
| 2006/0034556 A1* | 2/2006 | Thompson | F16C 33/1075 384/288 |
| 2015/0323001 A1* | 11/2015 | Carter | F16C 33/208 384/291 |
| 2015/0323006 A1* | 11/2015 | George | F16C 9/02 384/291 |
| 2016/0160908 A1* | 6/2016 | Gallas | F16C 17/10 384/368 |
| 2017/0058943 A1* | 3/2017 | Tanaka | F16C 9/02 |
| 2018/0066698 A1* | 3/2018 | Velverde Pereira | F16C 17/047 |

FOREIGN PATENT DOCUMENTS

| | | |
|---|---|---|
| JP | H10-068413 A | 3/1998 |
| JP | H10-068413 A | 3/1998 |
| JP | H11-201145 A | 7/1999 |
| JP | 2003-287055 A | 10/2003 |
| JP | 2003-334602 A | 11/2003 |
| JP | 2003-334602 A | 11/2003 |
| JP | 2004-036790 A | 2/2004 |
| JP | 2004-036790 A | 2/2004 |
| JP | 2008-128318 A | 6/2008 |
| JP | 2008-133904 A | 6/2008 |
| JP | 2008-133904 A | 6/2008 |
| JP | 2014-040899 A | 3/2014 |
| JP | 2017-180582 A | 10/2017 |
| WO | 2017-0170544 A1 | 10/2017 |

OTHER PUBLICATIONS

German Office Action for Application No. 11 2018 004 040.2 dated Apr. 7, 2020 (7 Pages), with English translation.

Summons for a Hearing issued in corresponding German Application No. 11 2018 004 040.2 dated Sep. 22, 2020 (20 pages).

Decision of Refusal issued in corresponding German Application No. 11 2018 004 040.2 dated Oct. 28, 2020 (19 pages).

Chinese Office Action for corresponding Application No. 201880058044.6, dated Oct. 16, 2020 (11 pages).

* cited by examiner

FIG. 3A
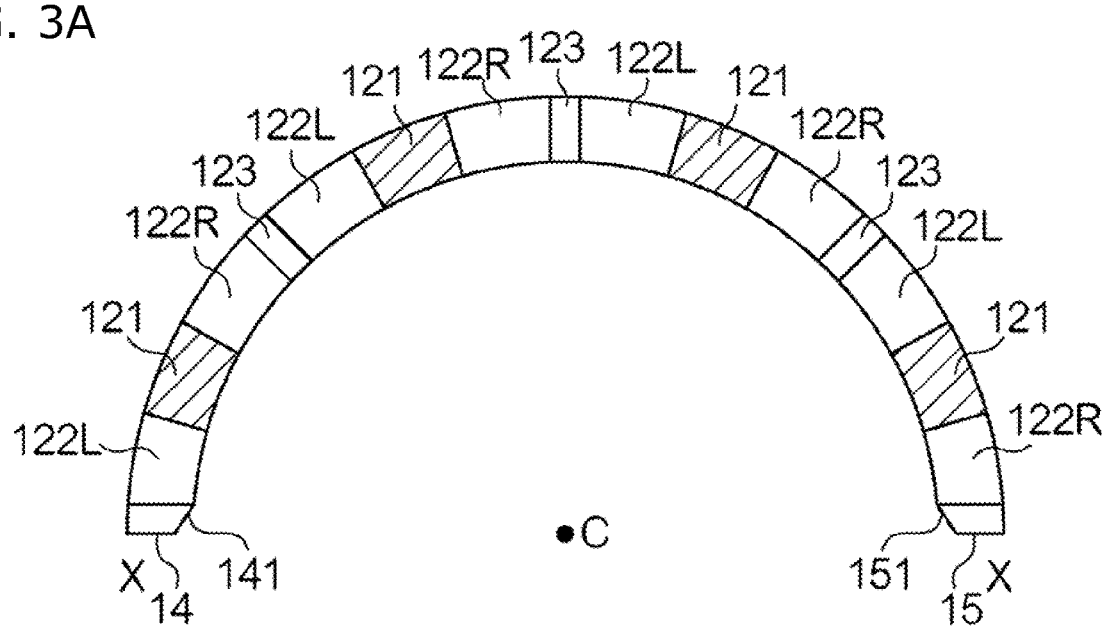
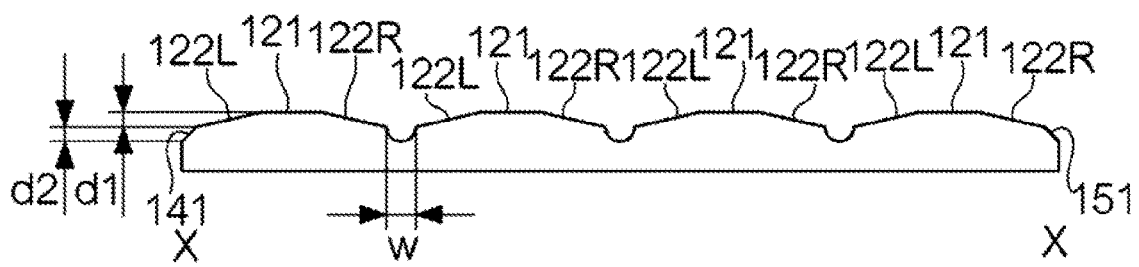
FIG. 3B

THRUST WASHER

CROSS REFERENCE TO RELATED APPLICATIONS

This application is a U.S. National Stage Application of International Application No. PCT/JP2018/032123, filed on Aug. 30, 2018, which claims priority to Japanese Application No. 2017-230202, filed on Nov. 30, 2017. The entire disclosures of the above applications are incorporated herein by reference.

TECHNICAL FIELD

The present invention relates to a thrust washer.

RELATED ART

Known in the art are thrust washers that have a taper/land structure formed on their thrust surface. For example, Japanese Patent Application Laid-Open No. 2014-40899 discloses a washer having a taper with a depth of 50 μm or less, and a ratio to a land portion between 0.5 and 0.9.

In the washer described in Japanese Patent Application Laid-Open No. 2014-40899, strict dimensional accuracy is required, resulting in high manufacturing costs.

In contrast, the present invention provides a thrust washer having a tapered portion that can be manufactured at a relatively low cost.

SUMMARY

The present invention provides a thrust washer including: a ring-shaped washer body having a first thrust surface and a second thrust surface subject to a thrust load; and a tapered portion formed on at least one of the first thrust surface and the second thrust surface, wherein the washer body has undulations a height of which exceeds a (difference in) height of the tapered portion in a direction perpendicular to the first thrust surface or the second thrust surface.

The at least one surface may have a land portion adjacent to the tapered portion in a circumferential direction of an annular shape The tapered portions are formed on both sides of the land portion in the circumferential direction.

Effect of the Invention

The present invention provides a thrust washer having a tapered portion that can be manufactured at a relatively low cost.

BRIEF DESCRIPTION OF THE DRAWINGS

FIGS. 3A and 3B are schematic diagrams illustrative of a surface structure of the thrust surface 12.

DETAILED DESCRIPTION

Figure 1:
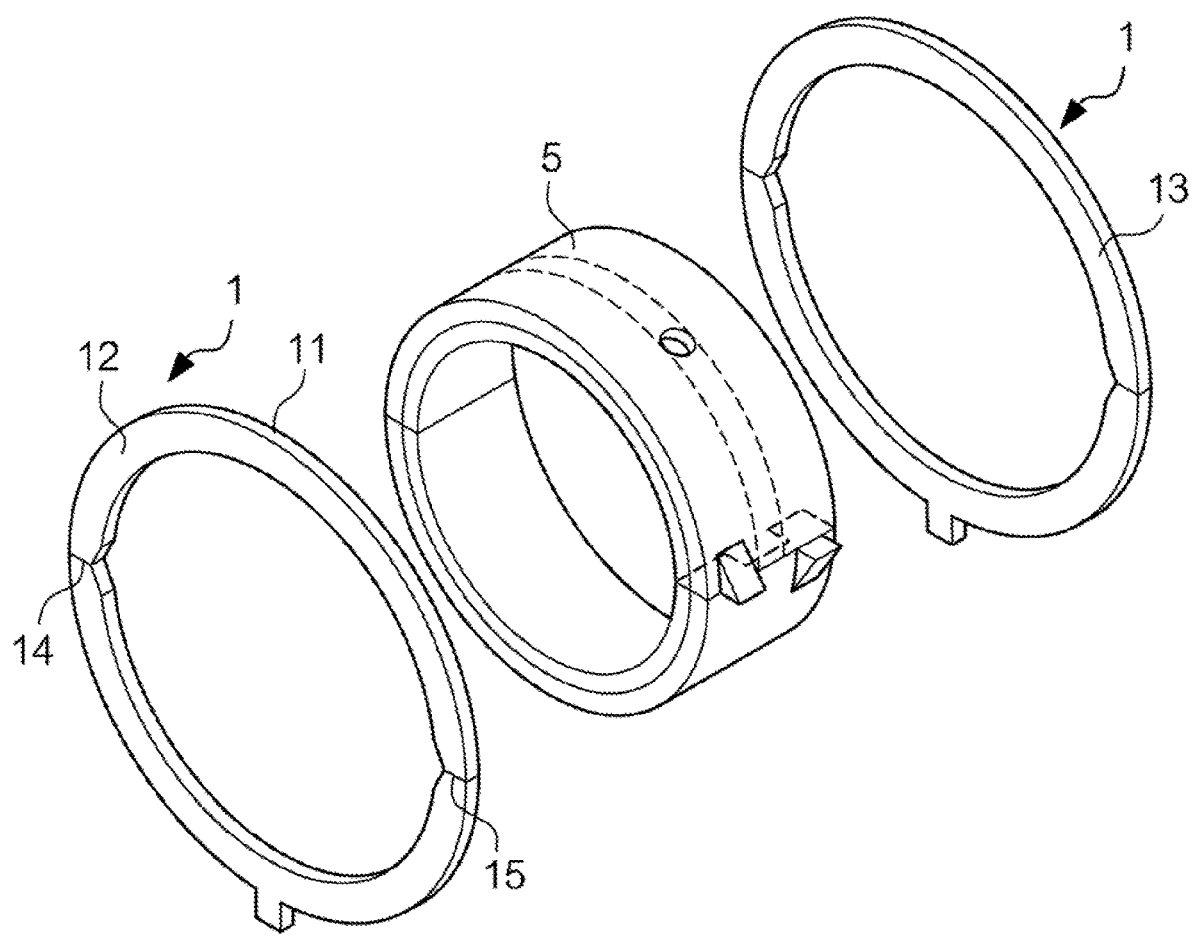
FIG. 1 shows an external appearance of a thrust washer 1 according to an embodiment.

FIG. 1 shows an external appearance of a thrust washer 1 according to an embodiment. The thrust washer 1 is, for example, a crank washer for use with a main bearing 5 in a motor vehicle engine. The thrust washer 1 has a half-ring-shaped washer body 11. The washer body 11 has a thrust surface 12, which is an example of a first thrust surface, and a thrust surface 13, which is an example of a second thrust surface. The thrust surface 12 and the thrust surface 13 each are surfaces that are subject to thrust loads. In addition, the washer body 11 has mating surfaces 14 and 15. The mating surfaces 14 and 15 either come into contact with or are situated in opposing relation to a mating surface of the thrust washer 1 when two thrust washers 1 are used in combination.

Washer body 11 may be formed from a single metal, aluminum or resin, or any combination of these, if it meets the properties required for the assumed use of thrust washer 1. The washer body 11 may have a single layer structure or a multi-layer structure. In the case of a multi-layer structure, the washer body 11 may have a structure in which metal layers of different materials or compositions are laminated (so-called bimetal), or a structure in which a resin coating layer is formed on the metal layer. In one example, the washer body 11 has a thickness of 2 mm or more and 4 mm or less.

Figure 2:
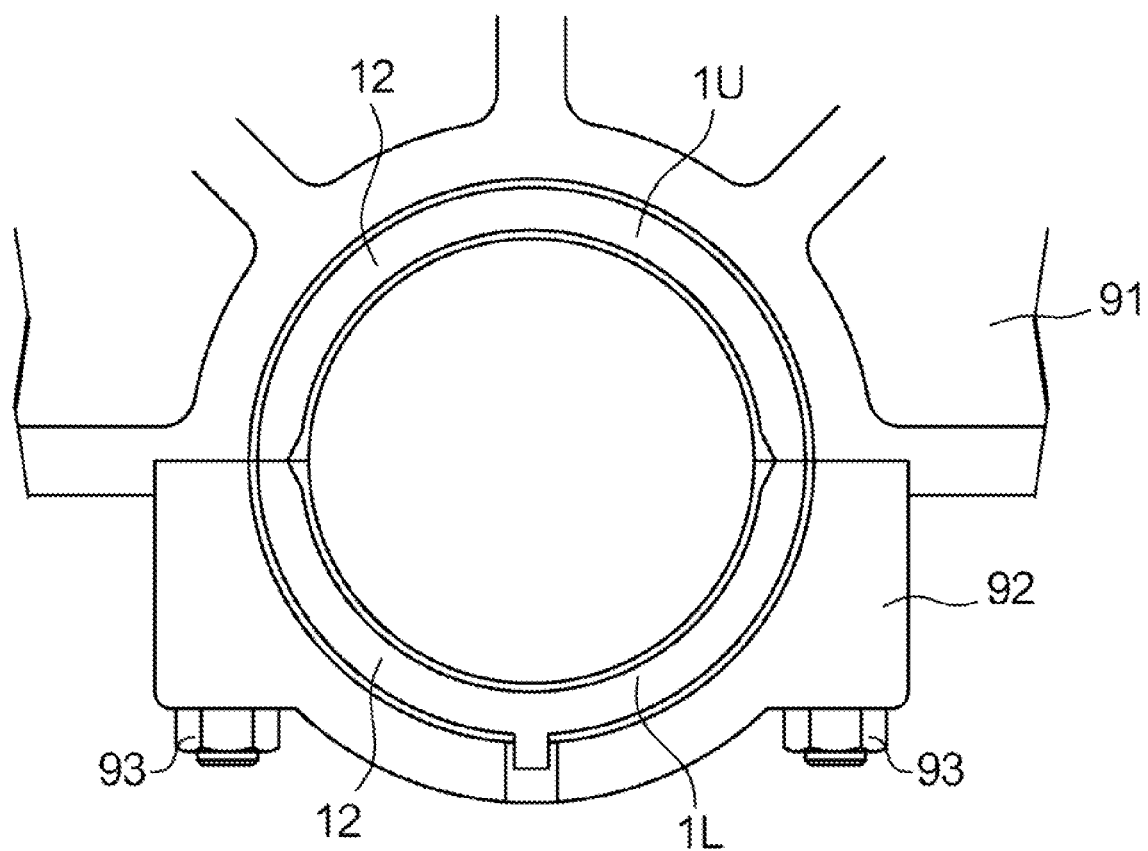
FIG. 2 shows an example in which the thrust washer 1 is used as a crank washer.

FIG. 2 shows an example in which the thrust washer 1 is used as a crank washer, viewed from a direction perpendicular to the axial direction of the crankshaft. Two thrust washers 1 are attached to the cylinder block 91 (or the housing) and the cap 92. Each of the cylinder block and the cap 92 is fixed with a nut 93. When the two thrust washers 1 are distinguished from each other, the one near the cylinder block 91 is referred to as thrust washer 1U, and the one near the cap 92 is referred to as thrust washer 1L. When thrust washers 1U and 1L are not distinguished from each other, they are simply referred to as thrust washer 1.

The thrust surface 12 receives a thrust load from a crankshaft (not shown in FIG. 2) and slides with the crankshaft (the thrust surface 12 is the surface on the side of the paper in FIG. 2). The thrust surface 13 is a surface that slides with the cylinder block 91 or the cap 92, which is hidden in FIG. 2.

FIGS. 3A and 3B show schematic diagrams illustrating a surface structure of the thrust surface 12. FIG. 3A shows a front view as viewed from the axial direction of the crankshaft. FIG. 3B shows an imaginary development view of a cross section taken along the line X-X in FIG. 3A. The cross section in FIG. 3B is a cross section parallel to the axial direction of the crankshaft, that is, a cross section parallel to the thickness direction of the thrust washer 1. Line X-X is an arc of a circle passing through the centers of the mating surface 14 and the mating surface 15 and centered at center C. Center C is a center of a circular arc constituting the outer periphery of the washer body 11.

The thrust surface 12 has a land portion 121, a tapered portion 122, and an oil groove 123. The land portion 121 is an area having a substantially constant height, that is, a substantially flat area. Here, the height refers to a distance from a reference plane whose position in the axial direction is fixed. In this example, since the thrust surface 13 is flat without a taper/land structure, the thrust surface 13 is a reference surface. The tapered portion 122 is a region in which the height continuously decreases from the land portion 121 toward the oil groove 123 (the definition of the height here is positive on the thrust surface 12 side and negative on the thrust surface 13 side). The oil groove 123 is a groove for holding lubricating oil. In this example, when the land portion 121 is used as a reference, the tapered portions 122 are formed symmetrically on both sides thereof. In FIG. 3, the tapered portion formed on the left side of the land portion 121 is referred to as tapered portion 122L, and the tapered portion formed on the right side of the land portion 121 is referred to as tapered portion 122R.

In this example, the unit structure composed of the pair of the tapered portion 122L, the land portion 121, and the tapered portion 122R appears repeatedly in the circumferential direction (four times in the example shown in the drawing). The oil grooves 123 are formed between the two unit structures (three in total in the example shown in the figure). A boundary between the land portion 121 and the tapered portion 122 extends radially from the center C. The center of the arc constituting the inner circumference of the washer body 11 is also the same as the center C. Similarly, the boundary between the oil groove 123 and the tapered portion 122 also extends radially from the center C. This means that the boundary between the land portion 121 and the tapered portion 122 is perpendicular to the sliding direction. The tapered portion 122 has a wedge effect, generating a so-called wedge film pressure on the lubricating oil present on the thrust surface 12. However, if the boundary between the land portion 121 and the tapered portion 122 is not perpendicular to the sliding direction, the lubricating oil flows to the lower pressure side, and the wedge effect is weakened. To enhance the wedge effect, it is preferable for the boundary between the land portion 121 and the tapered portion 122 to extends radially from the center C.

In one example, the taper ratio in each unit structure is 0.4 or more and 0.9 or less, more preferably 0.7 or more. The taper ratio refers to a ratio obtained by dividing the length of the tapered portion 122 (L1+L3 in the drawing) by the total length of the land portion 121 and the tapered portion 122 (L1+L2+L3 in the drawing). Further, in one example, the depth d1 of the tapered portion 122 is preferably 10 μm or more and 50 μm or less, more preferably 30 μm or more. The depth of the tapered portion 122 refers to the difference between the maximum height and the minimum height of the tapered portion 122 in the X-X cross section. It is preferable that the taper ratio and the depth of the tapered portion 122 are in the above range from the viewpoint of generating an appropriate wedge effect and preventing seizure with the mating material.

The oil groove 123 has a shape in which the surface side (opening side) is wide and the bottom portion is narrow. In the example of FIGS. 3A and 3B, the oil groove 123 has a shape of a part of a circle in a cross section perpendicular to the radial direction (direction in which the oil groove 123 extends). The width w of the oil groove 123 on the surface is 3 mm or more and 7 mm or less in one example. The depth d2 of the oil groove 123 is, in one example, 0.1 mm or more and 0.5 mm or less. The cross-sectional shape of the oil groove 123 is not limited to a circle. The cross-sectional shape of the oil groove 123 may be an ellipse, a trapezoid, a rectangle, a square, or a combination of any of these shapes. In addition, the oil groove 123 may be omitted.

A relief potion 141 and 151 are formed in the vicinity of the mating surface 14 and the mating surface 15. The relief portions 141 and 151 have larger inner diameters than other portions, and are relieved to prevent local contact with the crankshaft as a result of modification when assembled to the cylinder block 91 or the cap 92. Further, the relief portions 141 and 151 become thinner in a direction of thickness toward the mating surface 14 and the mating surface 15. In one example, the difference in thicknesses between the relief 141 and the relief 151 is 0.3 mm or more and 0.7 mm or less; and in one example, the circumferential lengths of the relief 141 and the relief 151 are 4 mm or more and 6 mm or less. The relief portions 141 and relief 151 may be omitted.

Although not shown in the example of FIGS. 3A and 3B, the thrust washer 1 may have a pawl (convex portion) that serves as a detent for preventing the thrust washer 1 from rotating relative to the cylinder block 91 or the cap 92. In this case, a relief for preventing the interference between the detent groove (not shown in the drawings) of the cylinder block 91 or the cap 92 and a claw may be formed at the base of the detent.

Figure 4:
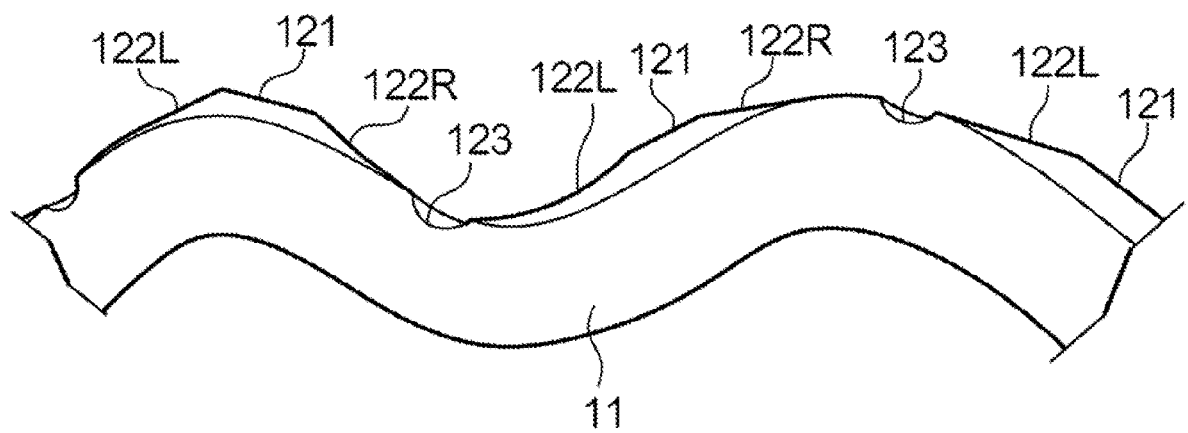
FIG. 4 illustrates a cross-sectional structure of the thrust washer 1.

FIG. 4 is a diagram illustrating a cross-sectional structure of the thrust washer 1. Although not shown in FIG. 3B, the thrust washer 1 has a waviness in the thickness direction in a state where it is not assembled to the cylinder block 91 or the cap 92, that is, where it is in a free state. Here, the term waviness refers to wave-like fluctuations in the position of the reference line of the washer body 11 in the thickness direction in accordance with the position in the circumferential direction. The amount of waviness can be quantified, for example, by placing the thrust washer 1 on a flat surface with the thrust surface 13 facing down, and measuring the step of the surface of the thrust surface 12 by a step meter in this state. In one example, the step of the surface of the thrust surface 12 is normalized such that the land portion 121 is flat. After normalization, the difference between the highest position and the lowest position of the step on the surface of the thrust surface 12 is referred to as "waviness" (waviness may also be referred to as "flatness"). The amount of waviness is larger than the depth (height difference) d1 of the tapered portion (the depth d1 of the tapered portion is a value after normalization). The amount of waviness may be twice or more the depth d1. In one example, the waviness amount is 60 μm or more and 0.1 mm or less. In FIG. 4, the surface structure and the waviness are exaggerated for illustrative purposes.

Although the thrust washer 1 has a waviness in a free state, when it is attached to the cylinder block 91 or the cap 92 and a thrust load is applied, the body of the washer 11 deforms in conformity with the cylinder block 91 or the cap 92. This deformation can absorb part of the thrust load. The thrust washer 1 after deformation is in a waviness-free (or low waviness) state as shown in FIGS. 3A and 3B. In this state, a taper/land structure as designed is formed on the thrust surface 12, and the effect of reducing friction due to the wedge effect is exhibited.

This waviness is caused by a manufacturing process using press working as described later. Even if there is waviness in the free state, dimensional accuracy in the free state is not required so long as the wedge effect can be exhibited when the housing is assembled and placed in the use state (the degree of flatness may be less than that of the design value of the taper depth). Dimensional accuracy of the taper/land structure is ensured, for example, by a difference between the wall thickness of the washer body 11 at the land portion 121 and the wall thickness of the washer body 11 at the tapered portion 122. According to the present embodiment, the thrust washer 1 can be manufactured at a lower cost by using press processing instead of cutting processing.

For example, according to experiments conducted by the inventors of the present application, when the thrust washer 1 has a waviness amount of only about 0.1 mm, a phenomenon in which only the apex portion of the waviness is locally was not observed in a test in which a thrust load of 500 to 2000 N was applied; and it also has been has been shown that a wedge effect is generated over the entire thrust surface 12.

The thrust washer 1 is manufactured by the following method, for example. A half ring, which is formed, for example, by punching, serves as the washer main body 11 and is taken out from the prepared plate material. The taper/land structures (the land portion 121 and the tapered portion 122) and the recesses (the oil grooves 123) provided in the washer body 11 are formed by press working. These taper/land structures and recesses may be formed at any time before or after punching the half ring.

Use of the press process in the working of the thrust washer 1, enables the thrust washer 1 to be manufactured at lower cost compared to use of the cutting working.

The present invention is not limited to the embodiments described above, and various modifications are applicable. Example modifications will be described below. Two or more of the following modifications may be combined, as appropriate.

Figure 5:
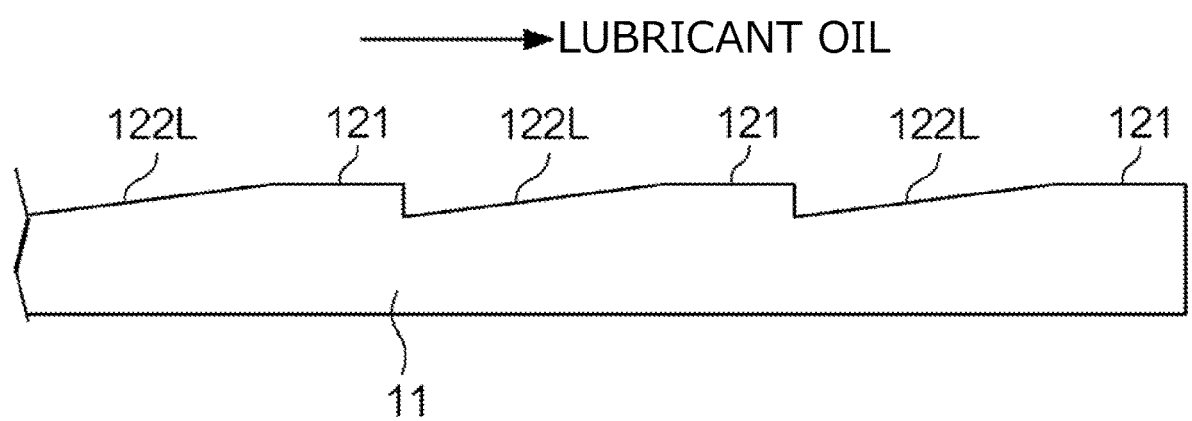
FIG. 5 illustrates a surface structure of a thrust washer according to a modified example.

FIG. 5 illustrates a surface structure of the thrust washer 1 according to one modification. In the embodiment, an example is described in which the tapered portions 122 are formed on both sides in the circumferential direction of the land portion 121. However, in this example, the tapered portion 122L is formed only on the upstream side of the land portion 121.

In the embodiment, an example is described in which the taper/land structure is formed only on the thrust surface 12 and the taper/land structure is not formed on the thrust surface 13. However, a taper/land structure may be formed on thrust surface 13 in addition to or instead of thrust surface 12. In other words, a tapered portion may be formed on at least one of the thrust surface 12 and the thrust surface 13. In a case where the taper/land structures are formed on both the thrust surface 12 and the thrust surface 13, the taper/land structures formed on the respective surfaces may be symmetrical or asymmetrical with respect to the reference line in the thickness direction.

The specific surface structure of the thrust washer 1 is not limited to the that illustrated in the embodiment. For example, the number of unit structures formed on the thrust surface 12 is not limited to four. The number of unit structures may be three or less, or five or more. The thrust surface 12 need not include the land portion 121. In addition, the depths of the tapered portion 122L and the tapered portion 122R may be different.

The shape of the washer body 11 is not limited to a half ring. The washer body 11 may have an annular shape, for example.

The thrust washer 1 is not limited to the one used as a crank washer of an engine. The thrust washer 1 may be used in a device other than an engine, as long as it is used in an environment in which lubricating oil is supplied.

It is of note that the numerical values of the dimensions illustrated in the embodiments are merely illustrative, and the present invention is not limited thereto.

The invention claimed is:

1. A thrust washer comprising:
    a ring-shaped washer body having a first thrust surface and a second thrust surface configured to be subjected to a thrust load;
    a tapered portion formed in at least one of the first thrust surface and the second thrust surface so that the tapered portion is formed in a surface of the washer body; and
    an oil groove formed in the at least one of the first thrust surface and the second thrust surface so that the oil groove is formed in the surface of the washer body, wherein
    an entirety of the washer body is formed of metal; and
    the washer body has a waviness, and an amount of waviness except for the oil groove is larger than a difference in height between an upper edge of the oil groove and a top of the tapered portion in a direction perpendicular to the at least one of the first thrust surface and the second thrust surface, and
    wherein the at least one of the first thrust surface and the second thrust surface has a land portion such that the tapered portion abuts both the land portion and the oil groove in a circumferential direction.

2. The thrust washer according to claim 1, wherein
    the tapered portion is formed on a first side of the land portion in the circumferential direction, and a second tapered portion is formed adjacent to the land portion on a second side of the land portion in the circumferential direction.

3. The thrust washer according to claim 1, wherein
    only one of the first thrust surface and the second thrust surface has the land portion and the tapered portion.

4. The thrust washer according to claim 3, wherein
    the tapered portion is formed on a first side of the land portion in the circumferential direction, and a second tapered portion is formed adjacent to the land portion on a second side of the land portion in the circumferential direction.

* * * * *